July 21, 1942.　　　　C. SAURER　　　　2,290,616
WHEEL CONSTRUCTION
Filed May 6, 1939　　　　4 Sheets-Sheet 1
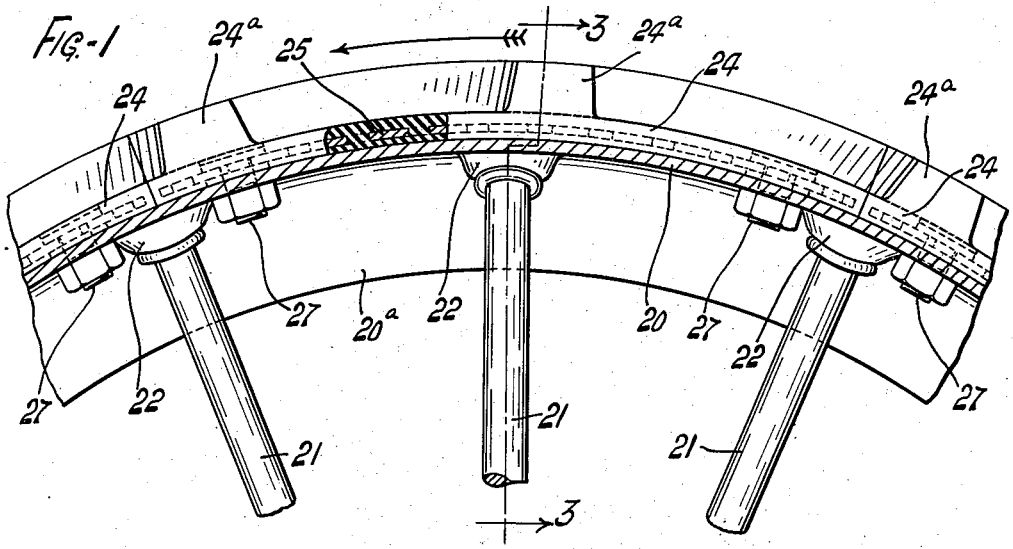
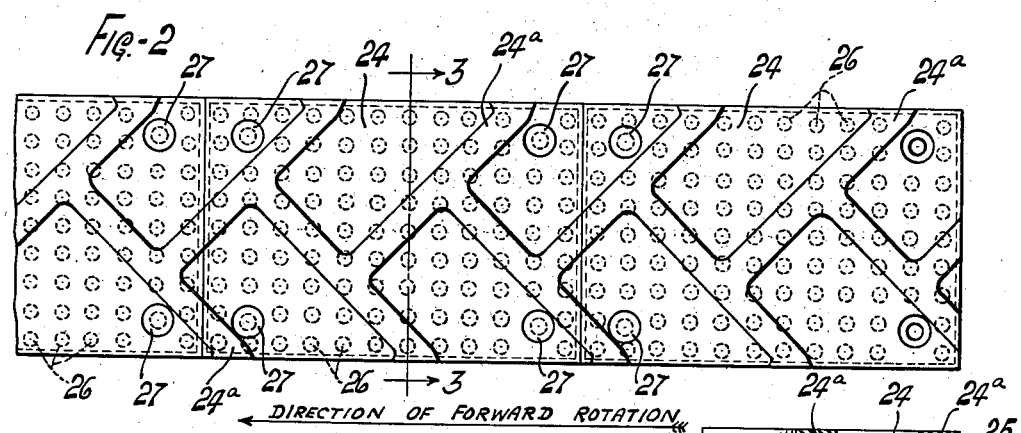
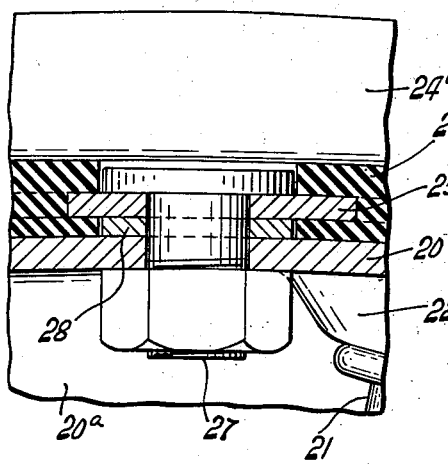
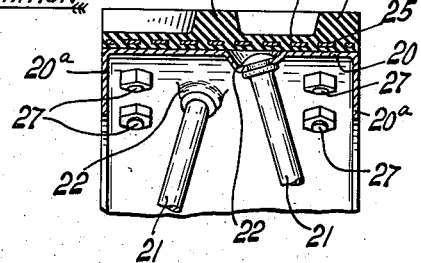
INVENTOR
CURT SAURER
ATTORNEYS July 21, 1942.   C. SAURER   2,290,616
WHEEL CONSTRUCTION
Filed May 6, 1939   4 Sheets-Sheet 2
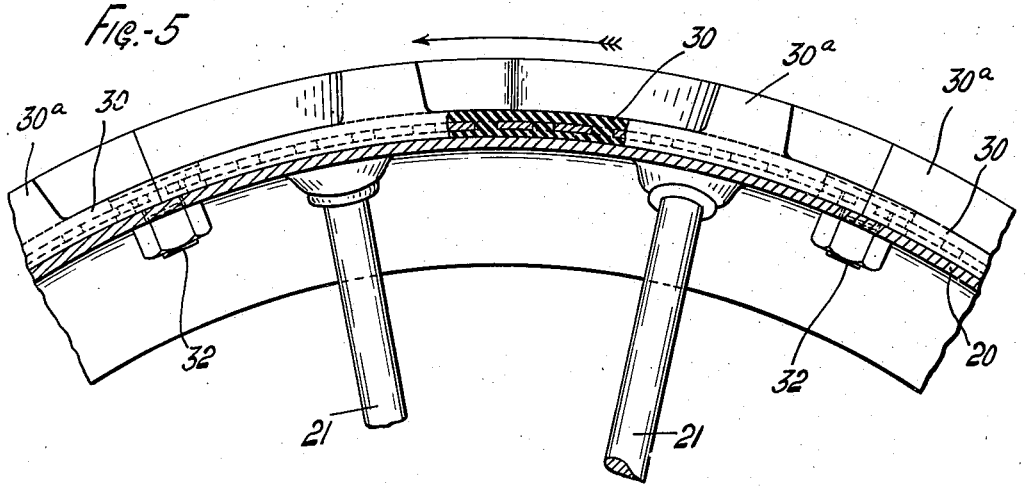
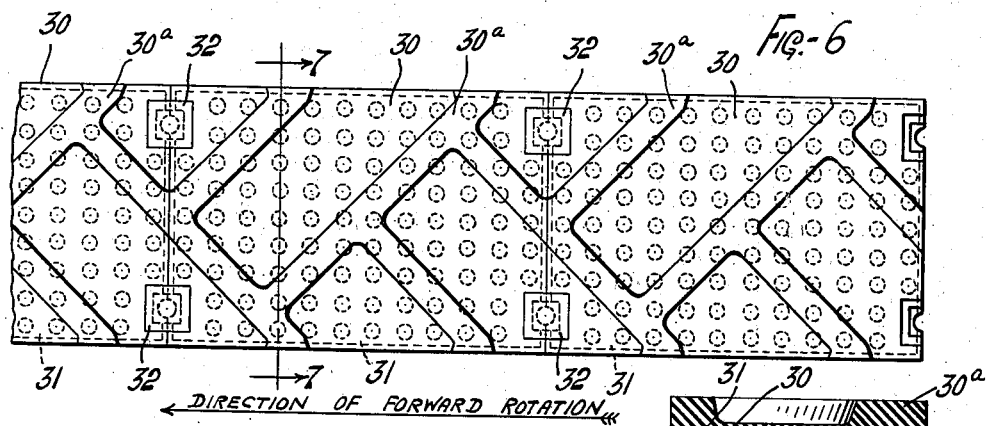
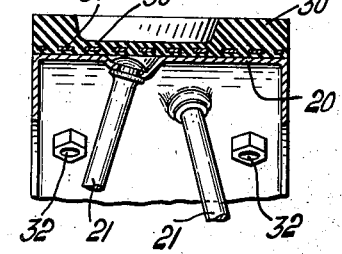
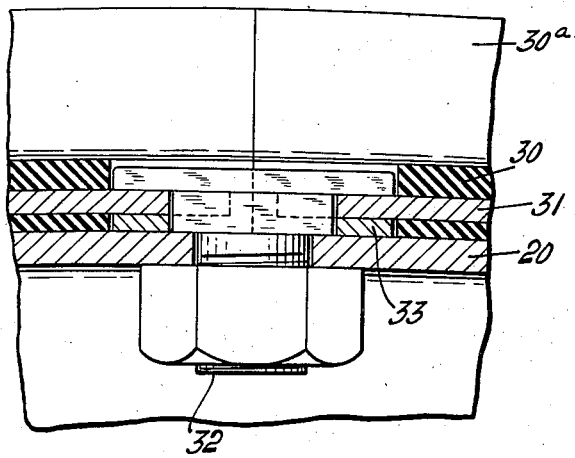
INVENTOR
CURT SAURER
BY
ATTORNEYS July 21, 1942.  C. SAURER  2,290,616
WHEEL CONSTRUCTION
Filed May 6, 1939  4 Sheets-Sheet 3
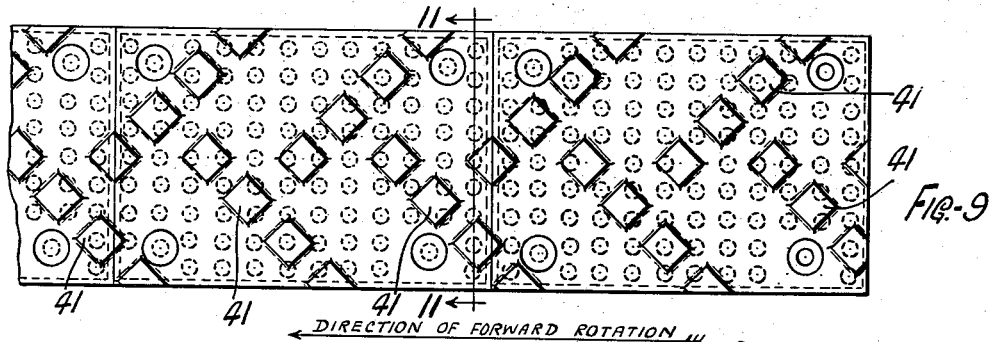
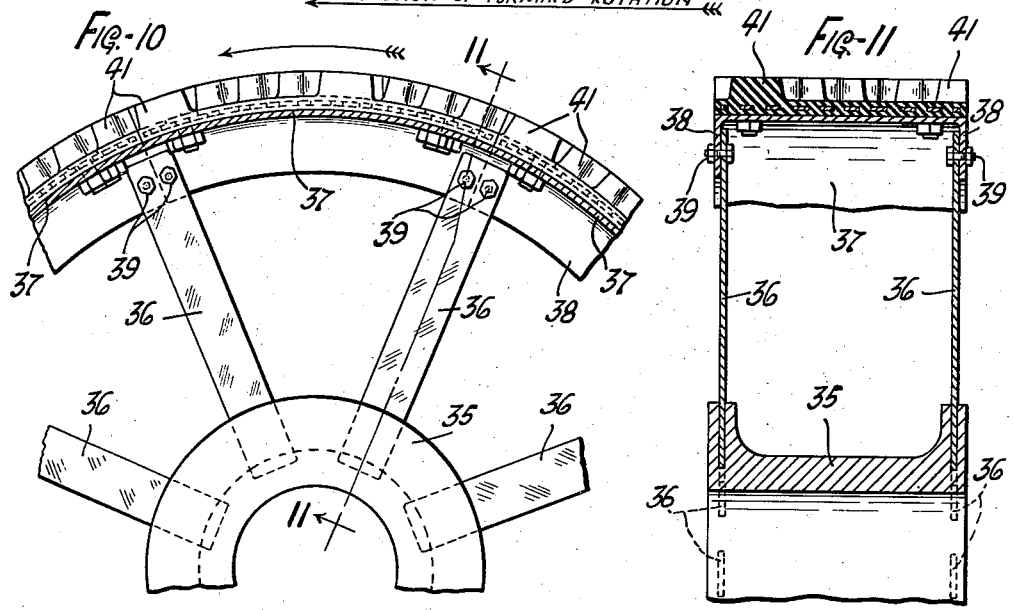
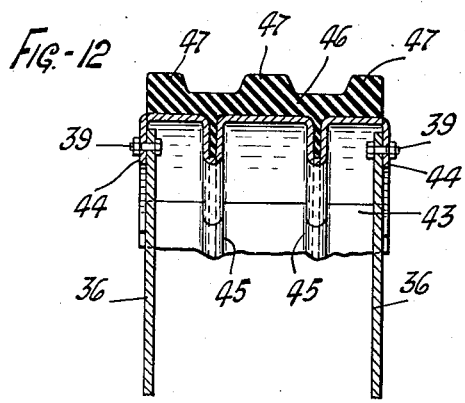
INVENTOR
CURT SAURER
BY
ATTORNEYS

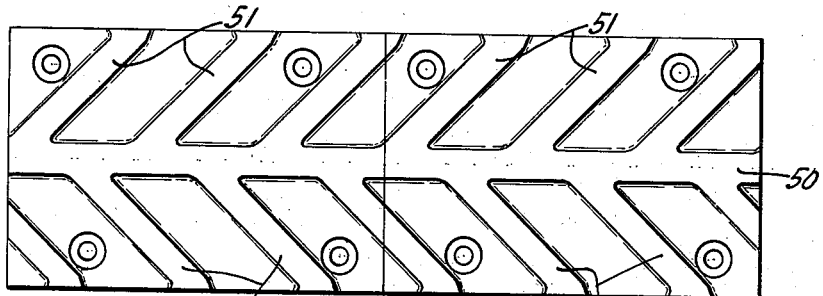
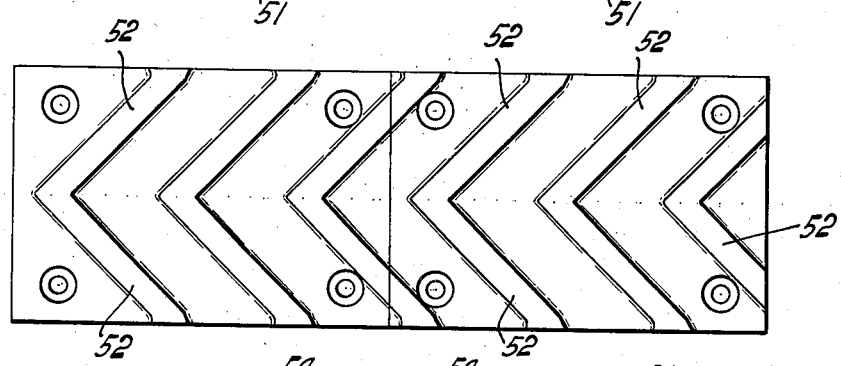
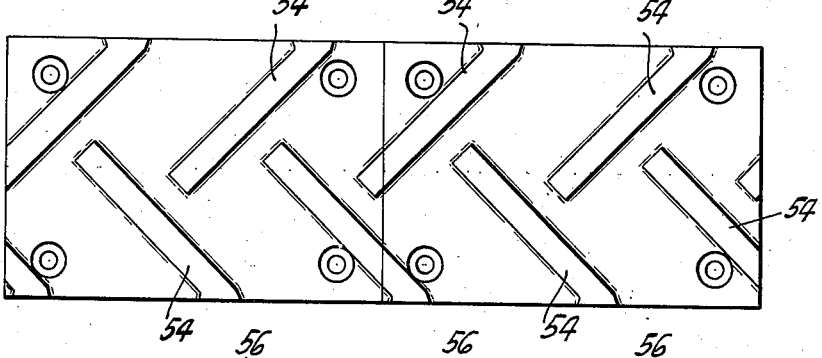
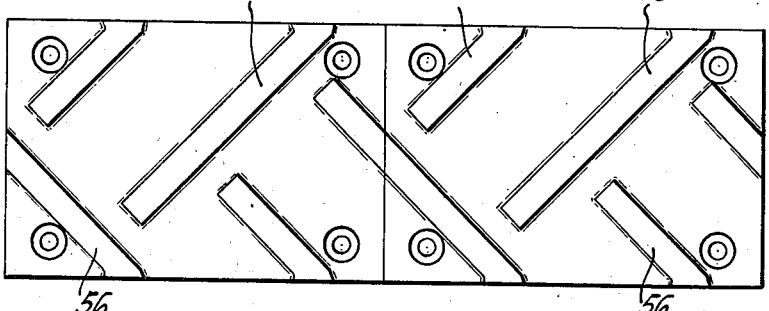

Patented July 21, 1942

2,290,616

UNITED STATES PATENT OFFICE 2,290,616

WHEEL CONSTRUCTION

Curt Saurer, Akron, Ohio, assignor to The Firestone Tire & Rubber Company, Akron, Ohio, a corporation of Ohio Application May 6, 1939, Serial No. 272,157

3 Claims. (Cl. 152—305)

This invention relates to wheel constructions, and more especially it relates to wheels that have removable, non-metallic, traction elements thereon.

The invention is of primary utility in its application to the wheels of agricultural vehicles such as tractors, and constitutes an improvement over the steel lugs frequently used on metal tractor wheels to give added traction thereto in that the non-metallic traction elements will not harm hard-surfaced roadways, and therefore are permissibly used in situations where steel-cleated wheels would be prohibited by state law.

The chief objects of the invention are to provide a wheel construction of the character mentioned that will be low in cost; that will not require the use of pneumatic tires; that may be used on the existing steel wheels of vehicles; to provide a segmental non-metallic tread structure for a metal wheel; and to provide a wheel construction of the character mentioned wherein local damage or wear may be remedied by the replacement of one or two tread sections without disturbing the remainder of the tread sections. Another object of the invention is to provide a wheel construction wherein the metal tire of the wheel is replaced by a circumferential series of traction elements. Other objects will be manifest as the specification proceeds.

Of the accompanying drawings:

Figure 1 is a fragmentary side elevation of a metal vehicle wheel, and a plurality of the improved tread elements mounted thereon, a part being in section;

Figure 2 is a plan view of the structure shown in Figure 1, on a somewhat smaller scale;

Figure 3 is a section on the line 3—3 of Figures 1 and 2;

Figure 4 is a sectional detail, on a larger scale, showing how the tread segments are secured to the metal tire of the wheel;

Figure 5 is a view similar to Figure 1 showing an alternative manner of securing the tread sections to the metal tire of a wheel;

Figure 6 is a plan view of the structure shown in Figure 5, on a somewhat smaller scale;

Figure 7 is a section on the line 7—7 of Figure 6;

Figure 8 is a sectional detail, on a larger scale, showing how the tread segments of Figure 5 are secured to the metal tire of the wheel;

Figure 9 is a fragmentary edge elevation of another embodiment of the invention;

Figure 10 is a fragmentary side elevation thereof, a part being shown in section;

Figure 11 is a section on the line 11—11 of Figure 9 and Figure 10;

Figure 12 is a section similar to Figure 11, showing a modified form of this embodiment of the invention; and Figures 13, 14, 15 and 16 are plan views of tread sections of modified traction characteristics.

Referring first to Figures 1 to 4 of the drawings, there is shown a wheel construction comprising an annular metal tire 20 and spokes 21, 21, the same being of any known or preferred arrangement. As is best shown in Figure 3, the tire 20 is locally deformed inwardly at a plurality of circumferentially spaced points, as shown at 22, 22, said deformations being apertured to receive the tenons at the ends of respective spokes, the tenons being headed or peened over to provide permanent connection between the spokes and the tire. The arrangement is such that the heads of the spokes 21 are below the peripheral face of the tire 20. The tire 20 is formed with inwardly extending lateral flanges 20a, 20a to give it adequate rigidity.

Mounted upon the perimeter of the metal tire 20 is a circumferential series of traction elements or tread sections 24, 24, which sections are rectangular in shape, are the same width as the tire, and are disposed in end to end relation so as completely to encircle the latter. The tread sections 24 are composed principally of tough, abrasion resisting, rubber composition, and are molded to arcuate shape. Completely embedded within the rubber structure of each tread unit is a metal reinforcing plate 25 of spring steel, said plate being located relatively close to the inner or concave face of the unit. The metal plate is formed within a multiplicity of apertures 26, 26 into which the rubber flows to provide a mechanical bond between the rubber and metal. The plate 25 also is brass plated before the rubber is applied thereto so that there is a chemical bond between the rubber and metal to supplement the mechanical bond. The tread units are secured to the tire 20 by being bolted thereto, the bolts, designated 27, being located at the four corners of each unit. The reinforcing plates 25 are suitably apertured to receive the bolts 27, the rubber structure being recessed about the bolt holes on each side of the plate to receive the bolt head on one side of the plate, and to receive a washer 28 positioned between the latter and the metal tire 20, as shown in Figure 4. Preferably the bolt heads are low and flat so as not to extend above the surface of the rubber structure. Preferably the tread units initially are of larger inside radius than the outside radius of the metal tire 20, so that the units are flexed when mounted, thus assuring that they will securely and closely embrace the surface of the tire.

The rubber tread sections are formed on their convex surfaces with raised traction elements or ribs 24a of suitable height to afford adequate traction in soft or sandy soil. As shown, the height of the ribs is about two-thirds of the total thickness of the sections. In the embodiment of the invention shown in Figure 1 the ribs 24a are disposed obliquely with relation to the centerline of the wheel, on each side of said centerline, the outer ends of the ribs extending to the lateral margins of the tread sections, the inner end of each rib being joined to a transversely disposed adjacent rib near the middle thereof. The ribs 24a define recurring patterns, identical multiples of which are located on each tread section so that the latter are uniform and capable of being manufactured in the same mold. A wheel construction having the tread design shown in Figure 2 functions best when rotating in a determinate direction, which direction is indicated by the arrow in said figure.

The invention provides a wheel construction capable of a multitude of uses, especially upon agricultural vehicles, and achieves the other advantages set out in the foregoing statement of objects.

In the embodiment of the invention shown in Figures 5 to 8 inclusive, the metal tire 20 and spokes 21 of the wheel are identical with those previously described. The perimeter of the metal tire is covered with a circumferential series of traction elements or tread sections 30, 30 which are essentially the same as the sections 24 previously described, being distinguished therefrom only in the arrangement of the means for securing the sections to the tire, and in the configuration of the traction elements or ribs 30a on the convex faces thereof. Each tread section 30 has a perforated metal plate 31 embedded therein, and the plate and rubber structure are recessed and notched at two spaced points in each end-margin thereof to receive suitable square-head bolts 32 that secure the tread section to the tire, the head of each bolt overlying two adjoining tread sections. A washer 33 is mounted upon each bolt 32, said washer being positioned between the metal plate 31 and the peripheral face of the tire 20, as shown in Figure 8.

As is best shown in Figure 6, the ribs 30a of the tread sections 30 are of two different lengths and are disposed obliquely with relation to the centerline of the wheel, alternate longer ribs being disposed at right angles to each other, each extending to a lateral margin of the tread at one of its ends and joining the adjacent long rib at its other end. Each short rib extends from a lateral margin of the tread to a long rib which it joins near the middle of the latter, alternate short ribs being disposed at right angles to each other. The tread design functions best when the wheel is rotating in the direction indicated by the arrow in Figure 6.

The embodiment of the invention shown in Figures 9 to 11 comprises a wheel having an axial hub 35, parallel radial spokes 36, 36 extending from each end of said hub, and a metal tire consisting of a circumferential series of arcuate sections 37, 37. Each of the tire sections 37 is formed with radial, inwardly extending lateral flanges 38, 38 that are secured at their opposite ends to respective spokes 36 by means of bolts 39. Mounted upon each tire section 37 is a traction element or tread section 24 previously described, the difference residing solely in the nature of the traction characters on the peripheral or convex face thereof. As shown in Figure 9, the traction characters consist of square lugs 41, 41 that are arranged in rows, which rows are arranged in the same order as the ribs 24a of the first described embodiment of the invention. The preferred direction of rotation of the wheel is indicated by the arrows in Figures 9 and 10.

The embodiment of the invention shown in Figure 12 is a modification of that shown in Figure 11, and utilizes the same hub and spokes as the latter. It distinguishes over the embodiments previously described in the feature of providing a metal tire and traction element in a unitary structure. A plurality of these composite structures are supported in end to end relation upon the spokes 36, in the manner previously described, and secured to said spokes by bolts 39. Each of said composite structures comprises a longitudinally arcuate metal plate 43 that is formed with radially inwardly extending flanges 44 on its respective lateral margins, the bolts 39 extending through said flanges to secure the plate to the spokes 36. Between said flanges the plate 43 is formed with two parallel, longitudinal, inwardly extending ribs 45, 45, which ribs impart rigidity to the structure. The walls of the ribs 45 may be spaced apart from each other as shown to provide grooves that are open to the convex side of the plate. Vulcanized to the convex side of plate 43 is rubber structure 46 that constitutes the tread thereof, the rubber entering the grooves in the ribs 45 to provide a stronger union of the rubber and metal. The rubber structure 46 is formed with elevated traction characters or ribs 47, 47 that may be disposed in any of the prior or subsequently described arrangements.

Referring now to Figures 13 to 16 there are shown tread units constructed in accordance with any of the previously described embodiments of the invention, but having distinguishing traction elements or ribs on the convex face thereof. Thus in Figure 13 the traction design comprises a circumferential rib 50 disposed along the centerline of the tire, and lateral ribs 51, 51 extending obliquely from the medial rib 50 to the respective lateral margins of the tread, the ribs 51 on one side of rib 50 being disposed at right angles to the ribs 51 on the other side thereof. Furthermore, the ribs 51 on one side of the rib 50 intersect the latter intermediate the points where the ribs 51 on the other side of said rib 50 intersect it.

In Figure 14, traction ribs 52 are arranged in the form of right angle chevrons, all of which are disposed in the same direction, and have their apices lying along the centerline of the tread.

The arrangement of the traction ribs shown in Figure 15 is essentially the same as that shown in Figure 2, there being ribs 54, 54 on opposite sides of the centerline of the tread extending obliquely to the adjacent lateral margins thereof. The arrangement differs from that shown in Figure 2 in that the inner ends of the ribs 54 do not join or intersect other ribs, but terminate short thereof to provide a space therebetween. In like manner the traction design shown in Figure 16 resembles that shown in Figure 6 in that it comprises obliquely disposed ribs 56 of different lengths extending to the lateral margins of the tread, the arrangement distinguishing over that shown in Figure 6 by the termination of the ribs at their inner ends short of intersection with other ribs. The traction designs of Figures 13 to 16 are all arranged for rotation of the wheel in a determinate direction, which direction is indicated by the arrow below Figure 16.

The chief merit of the invention is that it enables the tractive qualities of the best pneumatic tire design to be applied to farm vehicles such as tractors without requiring change of wheels or the employment of pneumatic tires. Pneumatic tires and wheels usually cost about two-thirds as much as the entire tractor, but the cost of the present type of wheel construction is only about one-tenth that of pneumatic tires, whereby substantial saving may be effected. Furthermore, in case of local damage, the damaged tread section may be replaced without disturbing the remaining sections.

Other modification may be resorted to without departing from the spirit of the invention, or the scope thereof as defined by the appended claims.

What is claimed is:

1. A wheel construction comprising a metal tire, a plurality of traction elements removably mounted upon the perimeter thereof, each of said elements comprising a rubber structure interiorly reinforced with sheet metal that is spaced from the upper and lower surfaces thereof, bolts engaging said reinforcing structures for securing said traction elements to the tire, and rigid means interposed between the reinforcing structures and the tire, around said bolts, whereby the reinforcing structures are clamped between said rigid means and the heads of the bolts.

2. A wheel construction comprising a metal tire, a plurality of traction elements removably mounted upon the perimeter thereof in end to end relation, each of said elements comprising a rubber structure interiorly reinforced with a sheet metal plate that is spaced from the upper and lower surfaces thereof, bolts extending through bolt holes in said reinforcing plate for securing said traction elements to the tire, the rubber structure of each of the said elements being recessed about the said bolt holes on each side of the plate to receive the heads of the bolts on the upper side of the plate, and metal washers mounted upon the respective bolts, between the plate and the tire, and received in the recesses of the rubber structure on the under side of the plate, whereby the plate is clamped between the washers and the heads of the bolts.

3. A combination as defined in claim 2 in which the bolts are located between the ends of adjacent traction elements with the heads of the bolts engaging the reinforcing plates in two traction elements.

CURT SAURER.